(12) United States Patent
Murphy

(10) Patent No.: US 6,629,410 B2
(45) Date of Patent: Oct. 7, 2003

(54) CONSTANT VELOCITY TRANSMISSION

(76) Inventor: Patrick Michael Murphy, P.O. Box 4765, Toowoomba East, Queensland (AU), 4350

( * ) Notice: Subject to any disclaimer, the term of this patent is extended or adjusted under 35 U.S.C. 154(b) by 0 days.

(21) Appl. No.: 09/996,857

(22) Filed: Nov. 19, 2001

(65) Prior Publication Data

US 2002/0178718 A1 Dec. 5, 2002

Related U.S. Application Data

(60) Provisional application No. 60/293,614, filed on May 29, 2001.

(51) Int. Cl.[7] ............................................. F16D 33/02
(52) U.S. Cl. ........................ 60/350; 60/330; 60/364
(58) Field of Search ........................ 60/330, 341, 342, 60/364, 350

(56) References Cited

U.S. PATENT DOCUMENTS

| | | | |
|---|---|---|---|
| 2,544,713 A | * | 3/1951 | Miller ........................ 60/350 |
| 3,455,110 A | * | 7/1969 | Cottrell ...................... 60/350 |
| 3,948,048 A | * | 4/1976 | Lifka ......................... 60/330 |
| 4,733,582 A | | 3/1988 | Eggert et al. |
| 4,942,786 A | | 7/1990 | Dittrich |
| 5,183,439 A | | 2/1993 | Yumoto et al. |
| 5,470,285 A | | 11/1995 | Schneider et al. |
| 5,961,408 A | | 10/1999 | Konig et al. |
| 6,209,320 B1 | * | 4/2001 | Peckham ..................... 60/330 |

* cited by examiner

Primary Examiner—Edward K. Look
Assistant Examiner—Thomas E. Lazo
(74) Attorney, Agent, or Firm—Donn K. Harms

(57) ABSTRACT

A constant velocity transmission which provides maximum torque and speed from a power source such as an internal combustion engine to an output shaft of the transmission while maintaining the engine at optimum operational speed. The transmission takes advantage of the principle of fluid friction to transmit rotational forces from drive blades mounted on an input shaft to stater blades positioned on the inside of a drum encompassing one end of the input shaft and the drive blades. The drive blades slidably mounted on a slanted surface of a drive drum on the input shaft and move closer to and away from the stater blades when laterally translated. Fluid driven by the drive blades imparts varied force and torque to the stater blades depending on their distance therefrom thereby transmitting variable speed and torque to the output shaft attached to the drum.

19 Claims, 3 Drawing Sheets

CONSTANT VELOCITY TRANSMISSION

This application claims the benefit of U.S. Provisional Application No. 60/293,614 filed on May 29, 2001.

FIELD OF THE INVENTION

The disclosed device relates to transmissions for motorized vehicles. More particularly it relates to a device which functions as a transmission which is coupled at an input end to power sources such as an internal combustion or turbine engine and transmits the energy from that power source to drive wheels or prop or other propulsion component of a vehicle varying the amount of torque and speed delivered the engine to fit the immediate requirements of the vehicle. The disclosed device could additionally function as a brake for vehicles when configured differently by attaching the output shaft to a generator or other device doing work, or to a fixed position on the frame of the vehicle, and the input shaft to the drive shaft or other shaft that communicates with the wheels of the vehicle to be slowed.

BACKGROUND OF THE INVENTION

Engine driven vehicles such as automobiles, buses, tractors, boats, and similar vehicles, conventionally use a transmission to communicate power and torque developed by the engine, to the wheels or drive of the vehicle. Additionally, helicopters and boats are frequently in need of changing the nature of the power transmitted from the engine to the propulsion components powering them varying both the torque and speed to a varying requirement. Early vehicles and current industrial vehicles frequently use a manual transmission which contains a series of different gears which may be interrelated to take input power from the engine and output that power to the wheels with sufficient torque and speed for the vehicle while maintaining the engine at optimum speed to operate.

Automatic transmissions operate to provide the same communication of variable torque and speed to the rear wheels only they do not require manual manipulation by the user nor a clutch to disengage the transmission during gear changes. Just like that of a manual transmission, the automatic transmission's primary job is to allow the engine to operate in its narrow range of speeds while providing a wide range of output speeds and torque to the drive wheels with which it communicates engine power. Without a transmission, vehicles would therefor be limited to one gear ratio and that ratio would have to be selected to allow the car to travel at the desired top speed. Such an arrangement would provide a vehicle with little acceleration when starting out, and, at high speeds, the engine would be nearing it maximum revolutions.

The key difference between a manual and an automatic transmission is that the manual transmission locks and unlocks different sets of gears to the output shaft to achieve the various gear ratios, while in an automatic transmission the same set of gears produces all of the different gear ratios. The planetary gearset in the automatic is the device that makes this possible in an automatic transmission. However, planetary gearsets, bands that lock parts of a gearset, and wet clutches that lock other parts of the gear set are prone to failure and slippage. Further, and incredibly complicated hydraulic control system is required to control the clutches and bands and gear sets of a conventional automatic transmission lending more potential problems to long term reliability in such devices.

As such, there is a pressing need for a transmission which will automatically vary the amount of torque and speed communicated to the wheels of a vehicle from the engine. Such a transmission should have few moving parts and systems to help insure reliability and ease of maintenance. Such a device should provide the optimum torque and speed to the wheels from the engine while allowing the engine to rotate and operate at its optimum performance speed.

SUMMARY OF THE INVENTION

The above problems and others are overcome by the herein disclosed constant velocity transmission which provides maximum torque and speed from the engine to the output shaft and the communicating drive component such as wheels on a vehicle, while maintaining the engine at optimum operational speed. The device herein disclosed and described features a minimum of moving parts and control systems to enhance reliability and performance over conventional automatic transmissions which as noted require a plethora of parts and complicated hydraulic operating and control systems.

The herein disclosed and described constant velocity transmission takes advantage of the principle of fluid friction to transmit rotational forces providing torque and speed to the output shaft from rotating input shaft communicating with the drive motor. Rotating freely or inside of an appropriate housing, the device develops fluid friction between the major components thereby communicating power from the input shaft, connected to the driving motor to an output shaft which rotates in direct correlation to the motor speed. This fluid friction transfers energy communicated from the rotating motor to the output shaft by way of the fluid friction that develops in the layers of fluid moving in the housing in relation to the input shaft velocity. Initially fluid friction is substantially zero until vanes about the circumference of the inside rotating cone shaped drive cone, laterally translate upon the sloped outer surface of the drive cone and move outward toward the inner ribbed surface of the outer drum. As they move closer to inside surface of the outer drive drum, the vanes increase the fluid friction on the inner ribbed surface thereby exerting more pressure on the outer drum and moving it in the direction of rotation. This fluid friction increases proportionally as the vanes move closer to the driven drum and decreases proportionally as the vanes laterally translate on the drive cone and move away from the driven drum.

This device will function using any number of different viscosity fluids for fluid friction communication, from conventional transmission oil to water with near equal efficiency since the determining factor is the distance between the translating vanes and the inner surface of the driven drum. In the case of watercraft, the water in which the boat itself moves might be used as the fluid for the device and provide additional benefits from an in exhaustive source and inherent cooling from such a large reservoir.

This device features a front input shaft communicating power from the drive engine to a drive cone, supported on the input shaft inside of a driven drum which in turn communicates power to an output shaft via the aforementioned fluid friction. The input shaft is appropriately supported by bearings and communicates this support to the drive cone. The driven drum acts as a housing for the components which serve to operate the assembled device and is filled with a working fluid such as hydraulic oil.

The drive cone which is housed internally in the driven drum has slidable drive vanes along its circumference which laterally translate about the center axis of the drive cone. This lateral translation of the drive vanes on the slope or incline of the drive cone frustro-conical shaped exterior causes the distal edges of the drive vanes to move closer to or further away from the vaned interior surface of the driven drum. As the translating drive vanes move outward closer to the inside vaned surface of the driven drum, the working fluid builds up fluid friction between the different layers of fluid moving at different velocities. This fluid friction rotates the output drum with a force that is in relation to the distance between the drive cone mounted vanes and the stater vanes formed on the surface of the drive strum. The smaller the distance, the greater the fluid friction and the consequential greater applied torque. Conversely, the greater the distance, the less applied torque.

The operation of the device herein disclosed and described is dependent on a working fluid, in this case, light weight oil such as conventional transmission oil. While some of the fluid remains internal inside the driven drum assembly, in the current best mode a reservoir of additional working fluid is stored in an external reservoir until the input shaft is rotated by an external power source such as a conventional gasoline or diesel engine. The input shaft has splines similar in shape to those of a hydraulic pump rotor and rotate inside a pump housing thereby providing pump operation as the shaft rotates. This pumping action provides the means to pressurize the operating fluid of the device during use.

The input shaft which communicates rotational power from the attached motor, supported by conventional bearings appropriately positioned in the outer housing supports the driven drum. The input shaft terminates into a bearing at the rear of the driven drum at an end plate which is attached to the output shaft which communicates power from the motor to the wheels or other device being powered. This arrangement thus allows the input shaft to rotate the drive cone located inside the driven drum, independently of the driven drum assembly with the communicating motor driving the input shaft and the driven drum driving the output shaft. Fluid friction transfers rotational energy from the drive cone and translating vanes thereon to the driven drum. The fluid friction intensity is inversely proportional to the distance between the movable drive vanes and the driven drum stator vanes. The smaller this distance, the larger the fluid friction.

Lateral translation of the vanes along the center axis of the drive cone about the slanted exterior surface is provided by a controllable pressure actuator plate. The pressure actuator plate acts to press upon the rear surface of the vanes and translate them up the ramps on the frustro-conical drive cone. A biasing means such as a spring acts on one end of the pressure actuator to move it rearward while a second controllable biasing means such a hydraulic pressure acts on the other end of the pressure actuator to move it toward the drive cone. By increasing the pressure acting to move the pressure actuator toward the drive cone, the reverse pressure from the rearward biasing means is overcome. Conversely, by decreasing the pressure of the second controllable biasing means, the bias provided by the rearward biasing means overcomes that of the controllable biasing means thereby moving the controllable pressure actuator plate away from the drive cone and allowing the vans to translate to a lower position on the drive cone and further away from the stator vanes of the driven drum. In this fashion, the torque from the input shaft communicated to the output shaft from the driven drum may be easily and accurately controlled to an infinite number of settings rendering the device infinitely variable in its ability to adjust the torque communicated to the output shaft.

As noted above, the device as herein described and disclosed could not only provide an infinitely variable transmission for a vehicle, but also a means to brake the speed of the vehicle by hooking the device to communicate with the rotating wheels on one end, and a fixed position on the vehicle or to a generator or pump on the output end to brake the vehicle by doing work.

Accordingly, it is the object of this invention claimed herein to provide a simplified automatic transmission device to transmit power from a power plant at varying amounts of torque and speed to the component being driven by the power plant.

It is another object of this invention to supply an automatic transmission for a vehicle to transmit power from the engine to the wheels at optimum levels of torque for the moment while concurrently maintaining engine speed at optimum levels.

It is still another object of this invention to supply a device which can also function as a brake for a vehicle by providing resistance to the rotation supplied from the output shaft to the device.

Further objectives of this invention will be brought out in the following part of the specification, wherein detailed description is for the purpose of fully disclosing the invention without placing limitations thereon.

BRIEF DESCRIPTION OF THE DRAWING FIGURES

The accompanying drawings which are incorporated in and form a part of this specification illustrate embodiments of the disclosed processing system and together with the description, serve to explain the principles of the invention.

DETAILED DESCRIPTION OF THE PREFERRED EMBODIMENTS

Figure 1:
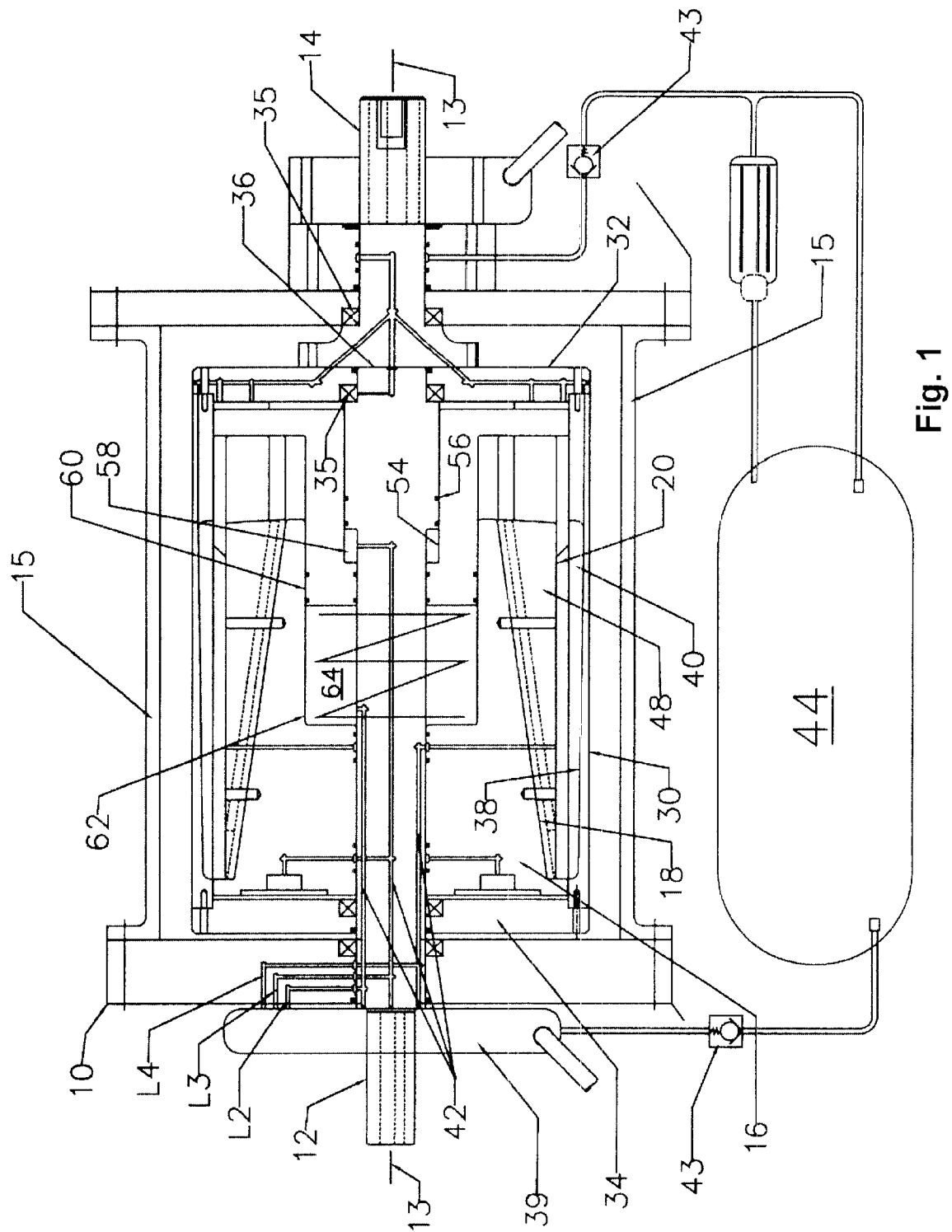
FIG. 1 is a cut away view of the device showing the components in configured for idle.

The device 10 herein disclosed functions using fluid friction to transmit rotational force from an input shaft 12 having a center axis 13 therethrough, communicating with a power source such as an internal combustion engine, a turbine engine, a jet engine, or similar means for power generation, to an output shaft 14 which is connected to the component to be driven or powered by the disclosed device 10. Generally drive wheels, propellers, flywheels, generators or any such components which require varied torque from the power source during their operation will benefit from using the disclosed device. As is obvious to those skilled in the art the components which use power from an engine or other source named herein are not all inclusive and use of the device 10 herein disclosed to communicate power to any component with varying torque requirements and speeds is anticipated. The various components of the disclosed device 10 may operate inside of an appropriate optional exterior housing 15, or may be self housed due to the configuration of the assembled device 10 allowing such. In operation, power communicated from the motor or engine or other means for power generation used in combination herewith is communicated to the input shaft 12. A drive cone 16 is attached to the input shaft 12 and the drive cone 16 center axis is essentially the center axis 13 of the input shaft. The drive cone 16 which is frustro conical in exterior dimension, has a sloped exterior surface 18 which has a diameter widest at the end closest to the drive input shaft 12 and is narrowest at the opposite end closest to the output shaft 14.

Figure 2:
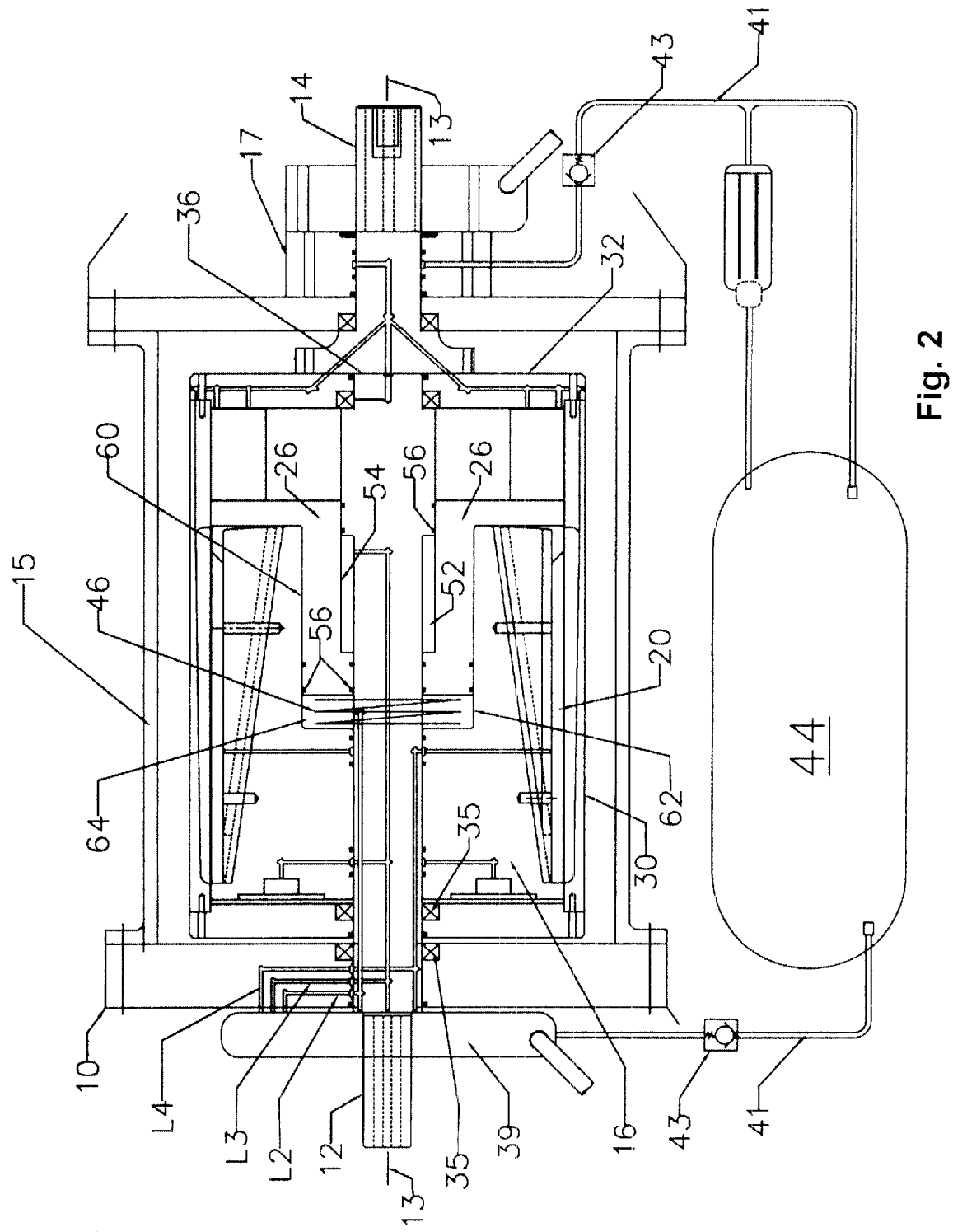
FIG. 2 is a cut away view of the device showing the components engaged to transmit maximum torque.
Figure 3:
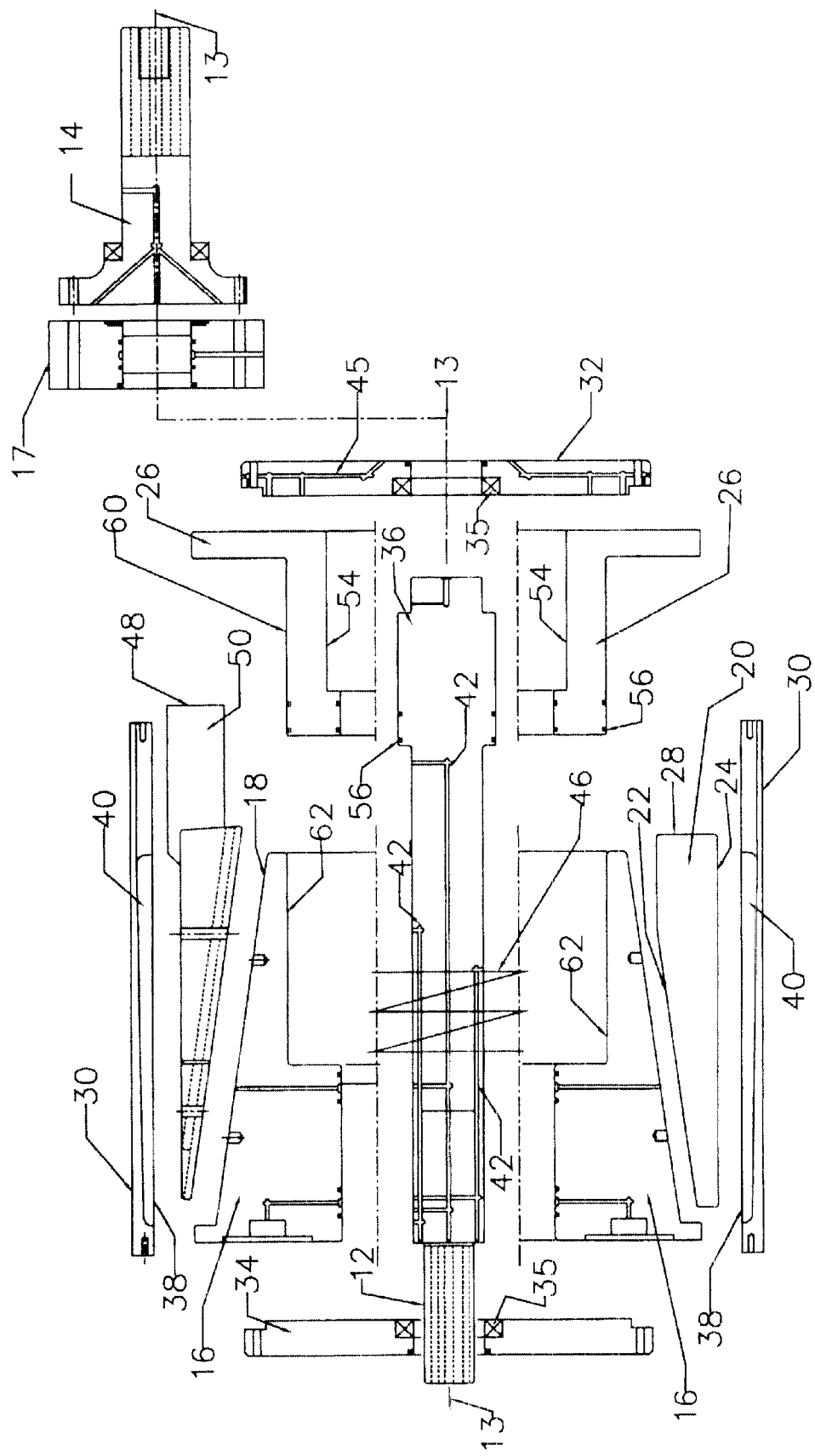
FIG. 3 is an exploded view of the components of the disclosed device.

A plurality of drive vanes 20 are attached to the sloped surface 18 of the drive cone 16 in line with the center axis 13 and substantially equidistantly spaced from each other. The drive vanes 20 are attached to allow them to laterally translate on the sloped surface 18 of the drive cone 16 from a retracted position of FIG. 1 to an extended position as shown in FIG. 2. The drive vanes 20 have an attachment edge 22 configured for cooperative engagement with the sloped surface 18 of the drive cone 16 such that they will laterally translate thereon. The distal edge 24 of the drive vanes 20, opposite the attachment edge 22, in the current best mode is angled in relation to the angle of the attachment edge 22, such that the distal edge 22 is substantially parallel with the center axis 13 of the input shaft.

Also mounted to the input shaft 12 is a pressure plate 26 which is configured for slideable engagement on the input shaft 12 to translate from rearward position wherein the drive vanes 20 have their distal edge 24 closest to the center axis 13 to a forward position toward the front of the input shaft 12 wherein the pressure plate 26 would press upon the rear edge 28 of the laterally translate drive vanes 20 thereby moving them to their extended position which places the distal edge 24 of the drive vanes 20 to their position furthest away from the center axis 13 and closest to the interior surface 38 of the driven drum 30.

Attached about the output shaft 14 either directly or using spacer 17 is the driven drum 30 which in the current best embodiment is supported for rotational movement about the center axis 13 by an end plate 32 which attaches to the front end of the output shaft 14 and a front plate 34 attached about the input shaft 12. The center axis 13 extends through the center axis of the driven drum to the center axis of the output shaft such that all are inline.

The internal or rear end 36 of the input shaft 12 is in a sealed relationship with the end plate 32 which has a conventional bearing 35 therein to allow rotation of the input shaft 12 in this engagement supported by the end plate 32; however other bearing arrangements could be used and are anticipated. A similar mounting arrangement allows the front plate 34 to be in a sealed engagement with the input shaft 12 and mounted thereon using a conventional bearing 35 or other similar device and a seal to allow the input shaft 12 to spin in its sealed engagement with the front plate 34. As is obvious to those skilled in the art, many bearing and seal relationships would allow the end plate 32 a sealed rotational engagement on the rear end 36 of the input shaft 12 and the front plate 34 to function with a sealed rotational engagement on the input shaft 12 and such are anticipated.

As can be seen, the front plate 34 and driven drum 30 and end plate 32 function to form a sealed housing for the drive cone 16 and drive vanes 20 and pressure plate 26 and the other components and working fluid inside the sealed housing so formed.

Formed on, or attached to, the interior surface 38 of the driven drum 30 are a plurality of stater vanes 40 substantially equidistant from each other in their position on the interior surface 38 of the driven drum 30. In operation, the power source would communicate rotational power to the input shaft 12 which rotates the attached drive cone 16. The drive vanes 20 which are laterally translateable in their mount to the drive cone 16 may be slid in their attachment on the exterior of the drive cone 16 to an infinite number of positions between those two points thereby allowing for an infinite number of positions of the distal edges 24 of the drive vanes 20 between their closest position to the interior surface 38 and their closest position to the center axis 13 thereby providing a means for lateral translation of the distal ends 24 of the drive vanes 20 toward and away from the center axis 13. Of course other such means to laterally translate the distal ends 24 of the drive vanes 20 toward and away from the center axis might be used and are anticipated, such as the drive vanes 20 being retracted into the drive cone 16 and internal hydraulic force inside the drive cone 16 communicating with and moving the attachment ends 24 of the drive vanes 20 away from the center axis; however the current best mode of the device 10 features the lateral translation of the drive vanes 20 in their slideable engagement on the outside of the drive cone 16.

Rotation of the input shaft 12 and attached drive cone 16 and drive vanes 20 submersed in the operating fluid of the device 10, from the power communicated from the power source, develops fluid friction in direct correlation to the motor speed. This fluid friction transfers energy communicated from the rotating motor or similar power source, to the output shaft 14 by way of the fluid friction that develops in the layers of fluid moving in the housing formed by the driven drum 30 and endplate 32 and front plate 34 which is in relation to the input shaft 14 velocity.

Initially fluid friction is substantially zero until the drive vanes 20 about the drive cone 16, are laterally translated upon the sloped outer surface 18 of the drive cone 16 by the pressure plate 26 moving from the rearward position toward the forward position. As the pressure plate 26 moves toward the forward position, the drive vanes 20 slide on the sloped surface 18 and their distal edges 24 move outward away from the center axis 13 and toward the inner ribbed surface formed by the stater vanes 40 on the inner surface 38 of the driven drum 30. As the distal edges 24 move closer to the stater vanes 40, they cause an increase of the fluid friction on stater vanes 40 on the interior surface 38 thereby exerting pressure on the driven drum 30 and moving it in the direction of fluid rotation. The force generated by this fluid friction increases proportionally as the drive vanes 20 move closer to the interior surface 38 of the driven drum 30 and the force so generated decreases proportionally as the drive vanes 20 laterally translate on the drive cone 16 and cause the distal edges 24 to move away from the interior surface 38 of the driven drum 30 and closer to the center axis 13. The force from the fluid friction thus rotates the driven drum 30 with a force that is in relation to the distance between the distal edges 24 of the drive vanes 20 and the stater vanes 40 formed or mounted on the surface of the driven drum 30. The smaller the distance, the greater the fluid friction and the consequential greater applied torque force. Conversely, the greater this distance, the less the fluid friction and resulting applied torque. As noted, the device 10 will function using any number of different viscosity fluids for fluid friction communication, from conventional transmission oil to water with near equal efficiency since the determining factor is the distance between distal edges 24 of the translating drive vanes 20 and the stater vanes 40 on the interior surface 38 of the driven drum 40.

A means to position or to laterally translate the pressure plate 26 between the rearward position and forward position, in the current best mode is provided by pressurizing the same fluid which is used to transmit power in the device 10. As depicted, the input shaft 12 has a means to pressurize the fluid in the form of pump 39 attached to the input shaft 12 thereby providing pump operation to pressurize fluid as the input shaft 12 rotates.

This pressurized fluid is then communicated via conventional tubing 41 and fluid passages 42 in the input shaft 14 to different points of the device internally and returned via the tubing 41 to an external reservoir 44 which communicates the working fluid back to the pump 39. In a simple embodiment for controlling the lateral translation of the pressure plate 26, a means to bias the pressure plate between the rearward and forward position is provided by a first biasing means such as a spring 46 acts on one end of the pressure plate 26 to bias it toward the rearward position while the controllable second biasing means provided by the hydraulic pressure ducted to the opposite side of the pressure plate 26 acts on the other end of the pressure plate 26 as a means to bias it toward the forward position. Using a control means such as a valve 43, by increasing the pressure acting to move the pressure plate 26 to the forward position, the rearward pressure from the first biasing means in the form of the spring 46 is overcome moving the pressure plate 26 forward. Using the control means to decrease the fluid pressure acting on the rear of the pressure plate 26, the rearward bias provided by the spring 46 overcomes the decreased hydraulic pressure and translates the pressure plate 26 to the rearward position.

Another means to laterally translate the pressure plate 26 can be provided by using controllable hydraulic pressure imparted to both sides of the pressure plate at varied force levels. The working fluid, in this case, light weight oil is stored in the reservoir 44 and as the input shaft 12 spins the pump 39 operates to draw operating fluid from the reservoir operating intake ports of the pump 12. Three fluid passages 42 are capable of communicating pressurized working fluid from the pump. A first hydraulic line L4 is pressurized with low pressure and high fluid volume and supplies pressurized working fluid into formed fluid passages 42 in the input shaft 12 that exit at each of the drive vanes 20 and in cavities and other points throughout the device 10 to provide a continuous supply of cool working fluid throughout the device 10 as would be conventionally done with most mechanical devices needing lubrication and cooling. The fluid from the first hydraulic line L4 also acts as the working fluid whose viscosity allows the drive vanes 20, to react by way of the aforementioned fluid friction with the stater vanes 40 attached to the driven drum 30.

Two other hydraulic lines, L2 and L3, are pressurized in low volume but with high pressure through a valve assembly, (not specified), that can be either within the pump 39 or external, depending upon application. This valve assembly is interrelated between the on ports and has three positions with Line L2 on or off, and Line L3 being on. If turned to Line L2 on position, the valve opens Line L3 to the on position allowing the high pressure in Line L3 to dissipate to the working fluid pressure of L4. When reversed, the valve operates in reverse for operation in the other direction. In other words, if L2 is pressurized and L3 is vented to the working fluid pressure at the same time. Finally, if L3 is pressurized, L2 is vented to the working fluid pressure at the same time.

Operating as a means to control power imparted from the input shaft 12 to the driven drum 30 when the valve assembly is turned to a position to increase the RPM of the driven drum 30, it opens L3 to fluid pressure from the pump 39, and L2 simultaneously goes to the vent position, (working fluid low pressure). The high pressure fluid flows along L3 from the pump 39 into the front outer housing, through the machined opening of the input shaft 12. Once in the input shaft this fluid pressure flows along the drilled orifice of L3, exiting into a chamber 52 formed by the outer circumference of the input shaft 12 and the inside surface 54 of the pressure plate 26 at its attachment about the input shaft 12. These two mating surfaces are sealed at either end by O-Rings 56 or similar seals and thereby form a first hydraulic cylinder 58 that acts as a means to laterally translated the pressure plate 26 along the outside of the input shaft 12.

As the hydraulic pressure in L3 increases the pressure in the hydraulic cylinder 58, moves the pressure plate 26 toward the forward position, the outside wall 60 of the pressure plate 26, slides within a cooperating surface 62 formed in the drive cone 16. The cooperating surfaces are sealed with seals such as O-Rings 56 and form a second hydraulic cylinder 64 that operates directly opposite the action of the first hydraulic cylinder 58. Line L2, which connects the valve assembly to the second hydraulic cylinder 64, is vented by the valve action to the working fluid pressure as Line L-3 is pressurized.

As the valve assembly is turned to a position to increase the RPM, several things take place at once. Hydraulic pressure of Line L3 is increased. Hydraulic pressure of Line L2 is vented to working fluid. The pressure increase in the first hydraulic cylinder 58, and corresponding pressure decrease in the second hydraulic cylinder 64, overcomes the bias of the spring 46, and the pressure plate 26 moves toward the forward position thereby causing the drive vanes 20 to laterally translate on the drive cone 16 and move closer to the stater vanes 40 in the aforementioned fashion. When the drive vanes 20 slide forward along channels machined into the outside diameter of the drive cone 16 in the current best mode, they are held in line by the outer cone segments 48 that bolt directly to the drive cone 16 and are machined to accept the retaining flange of the movable drive vanes 20. As the drive vanes 20 slide forward in their machined groves they also move outward up the slope of the drive cone 16, increasing their relative diameter in the aforementioned operation forming the fluid friction between the drive vanes 20 and stater vanes 40 transferring energy from the rotating drive cone 16 assembly to the driven drum 30. This energy transfer moves the driven drum 30 in the direction of rotation as that of the drive cone 16.

When the valve position is reversed, the drive cone 16 rotates with the drive vanes 20 in the full rearward position and the driven drum 30 slows to a stationary position because no fluid friction takes place between the driven drum 30 and the drive cone 16 because the outer surface of the drive cone is with the drive vanes 20 retracted is distanced too far from the stater vanes 40 to exert enough force on them to move the driven drum 30.

Of course those skilled in the art will realize that other means to laterally translate the pressure plate 26 from its rearward position to the forward position and back, could be used such as solenoids, cables, etc. and such is anticipated. However the current best mode works using pressurized working fluid to act upon the pressure plate 26 and a control means such as a valve to control the positioning of the pressure plate 26 by controlling the transmitted fluid pressure thereto. The pressurized fluid either works as two hydraulic cylinders opposing each other, or as one hydraulic cylinder opposing another biasing means such as a spring 46. As can be seen, using this means to control the position of the pressure plate 26 to an infinite number of positions between its rearward position and forward position, the torque from the input shaft 12 communicated to the output shaft 14 from the driven drum 30 may be easily and accurately controlled to an infinite number of positions of the pressure plate 26 between its forward position and rearward position, thus rendering the device 10 infinitely variable in its ability to adjust the torque communicated to the output shaft 14.

Also shown in the drawings are other components of the device 10 in the form of a plurality of drive cone outer vane segments 48 which are attached about the drive cone 16 between the drive vanes 20 and in the current best mode provide reinforcement to the drive vanes 20. These are fixed vanes 48 that remain in position during the translation of the pressure plate 26 and resulting translation of the drive vanes 20. The rearward portion 50 of the vane segments 48 is shaped to cooperatively engage with slots formed in the pressure plate 26 and the register with those slots thereby allowing the translation of the pressure plate 26 from the rearward position to the forward position during adjustment of the output of the device 10 to the user requirements.

As noted above, the device herein disclosed is ideally suited as a transmission for a land vehicle or water vehicle. However, as also noted, the device 10 could also function as a brake for a wheeled vehicle by mechanically communicating the input shaft 12 with the wheels of a vehicle and having the output shaft communicate with a generator, pump, or to a flange attached to the vehicle frame. The output shaft 12 would thus do work with the pump or generator, or when attached to a fixed position, such as a fixture on a vehicle frame (not shown), the friction of the fluid inside the driven drum 30 would also provide resistance and thus braking to the vehicle.

While all of the fundamental characteristics and features of the present invention have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined by the following claims.

What is claimed is:

1. A constant velocity transmission for use in combination with a rotational power source comprising:

an output shaft having a center axis therethrough;

a drum attached at rear end to said output shaft, said drum having a front end, a rear end, and having a cylindrical wall communicating between said rear end and said front end;

said cylindrical wall having an interior surface and an exterior surface;

a sealed housing defined by the area in between said cylindrical wall and said front end and said rear end of said drum;

an input shaft having a center axis therethrough in line with said center axis of said output shaft;

said input shaft having a front end and having an internal end communicating in sealed rotational engagement through said front end of said drum and into said sealed housing;

a drive cone mounted about said input shaft, said drive cone having a first end and a second end, said first end having a diameter larger than said second end, thereby forming an inclined exterior surface area;

a plurality of drive vanes each having an attachment edge and a distal edge, said drive vanes slidably attached at said attachment edge to said exterior surface of said drive cone, said drive vanes laterally translateable on said exterior surface between a rearward position and a forward position in line with said center axis;

means to laterally translate said plurality of drive vanes to a determined position at an infinite number of points between said rearward position and said forward position;

a plurality of stater vanes located about said interior surface of said cylindrical wall;

said distal ends of said drive vanes varying in distance from said stater vanes depending upon said determined position;

fluid located in said sealed housing; and said input shaft when rotated by said rotational power source thereby imparting rotational force to said fluid in said sealed housing, said fluid rotating said drum by imparting said rotational force to said stater vanes, said rotational force imparted to said drum being infinitely variable depending upon said determined position, whereby and the speed and torque communicated to said output shaft attached to said drum, from said input shaft, may be infinitely varied by laterally translating said plurality of drive vanes to said determined point between and thereby adjusting the distance between said distal ends of said drive vanes and said stater vanes.

2. The constant velocity transmission of claim 1 wherein said means to laterally translate said plurality of drive vanes to a determined position at an infinite number of points between said rearward position and said forward position comprises:

a pressure plate attached about said input shaft and laterally translateable thereon between a first position and a second position;

a first means for biasing said pressure plate toward said first position at a first force;

a second for means for biasing said pressure plate toward said second position at a second force;

means to control the ratio between said first force and said second force to thereby translate said pressure plate between said first position and said second position; and said pressure plate in contact with a side edge of said drive vanes, said pressure plate thereby laterally translating said drive vanes to said determined position depending on the ratio of force between said first force exerted by said first means for biasing and said second force exerted by said second means for biasing.

3. The constant velocity transmission of claim 2 wherein said first means for biasing is a spring and said second means for biasing is provided by hydraulic pressure acting on said pressure plate, said hydraulic pressure provided by a means to pressurize said fluid, and said means to control the ratio between said first force and said second force is provided by a valve which varies the amount of hydraulic pressure communicated to said pressure plate from said means to pressurize said fluid.

4. The constant velocity transmission of claim 3, further comprising;

an external housing having a front end, a rear end, and a sidewall;

an interior cavity defined by the area between said front end, said rear end, and said sidewall;

said input shaft rotationally engaged through said front end of said housing;

said output shaft rotationally engaged through said rear end of said housing; and said interior cavity dimensioned to allow rotation of said drum therein.

5. The constant velocity transmission of claim 3, further comprising;

a plurality of outer vane segments fixedly attached to said drive cone adjacent to said second end of said drive cone;

said outer vane segments positioned substantially equidistant between said drive vanes;

said outer vane segments having a first edge attached to said drive cone and a second edge adjacent to said interior surface of said interior surface of said interior wall;

said outer vane segments having a rearward edge extending from said second end of said drive cone; and said pressure plate having a plurality of slots located to cooperatively engage said rearward edge of said outer vane segments during lateral translation of said pressure plate.

6. The constant velocity transmission of claim 2 wherein said first means for biasing is provided by hydraulic pressure acting on said pressure plate and said second means for biasing is also provided by hydraulic pressure acting on said pressure plate, said hydraulic pressure provided by a means to pressurize said fluid, and said means to control the ratio between said first force and said second force is provided by a valve which varies the amount of hydraulic pressure communicated to said pressure plate by said first means for biasing and said second means for biasing from said means to pressurize said fluid.

7. The constant velocity transmission of claim 6, further comprising;

an external housing having a front end, a rear end, and a sidewall;

an interior cavity defined by the area between said front end, said rear end, and said sidewall;

said input shaft rotationally engaged through said front end of said housing;

said output shaft rotationally engaged through said rear end of said housing; and said interior cavity dimensioned to allow rotation of said drum therein.

8. The constant velocity transmission of claim 6, further comprising;

a plurality of outer vane segments fixedly attached to said drive cone adjacent to said second end of said drive cone;

said outer vane segments positioned substantially equidistant between said drive vanes;

said outer vane segments having a first edge attached to said drive cone and a second edge adjacent to said interior surface of said interior surface of said interior wall;

said outer vane segments having a rearward edge extending from said second end of said drive cone; and said pressure plate having a plurality of slots located to cooperatively engage said rearward edge of said outer vane segments during lateral translation of said pressure plate.

9. The constant velocity transmission of claim 2, further comprising;

an external housing having a front end, a rear end, and a sidewall;

an interior cavity defined by the area between said front end, said rear end, and said sidewall;

said input shaft rotationally engaged through said front end of said housing;

said output shaft rotationally engaged through said rear end of said housing; and said interior cavity dimensioned to allow rotation of said drum therein.

10. The constant velocity transmission of claim 9, further comprising;

a plurality of outer vane segments fixedly attached to said drive cone adjacent to said second end of said drive cone;

said outer vane segments positioned substantially equidistant between said drive vanes;

said outer vane segments having a first edge attached to said drive cone and a second edge adjacent to said interior surface of said interior surface of said interior wall;

said outer vane segments having a rearward edge extending from said second end of said drive cone; and said pressure plate having a plurality of slots located to cooperatively engage said rearward edge of said outer vane segments during lateral translation of said pressure plate.

11. The constant velocity transmission of claim 2, further comprising;

a plurality of outer vane segments fixedly attached to said drive cone adjacent to said second end of said drive cone;

said outer vane segments positioned substantially equidistant between said drive vanes;

said outer vane segments having a first edge attached to said drive cone and a second edge adjacent to said interior surface of said interior surface of said interior wall;

said outer vane segments having a rearward edge extending from said second end of said drive cone; and said pressure plate having a plurality of slots located to cooperatively engage said rearward edge of said outer vane segments during lateral translation of said pressure plate.

12. The constant velocity transmission of claim 1, further comprising;

an external housing having a front end, a rear end, and a sidewall;

an interior cavity defined by the area between said front end, said rear end, and said sidewall;

said input shaft rotationally engaged through said front end of said housing;

said output shaft rotationally engaged through said rear end of said housing; and said interior cavity dimensioned to allow rotation of said drum therein.

13. The constant velocity transmission of claim 12, further comprising;

a plurality of outer vane segments fixedly attached to said drive cone adjacent to said second end of said drive cone;

said outer vane segments positioned substantially equidistant between said drive vanes;

said outer vane segments having a first edge attached to said drive cone and a second edge adjacent to said interior surface of said interior surface of said interior wall;

said outer vane segments having a rearward edge extending from said second end of said drive cone; and said pressure plate having a plurality of slots located to cooperatively engage said rearward edge of said outer vane segments during lateral translation of said pressure plate.

14. The constant velocity transmission of claim 1, further comprising;

a plurality of outer vane segments fixedly attached to said drive cone adjacent to said second end of said drive cone;

said outer vane segments positioned substantially equidistant between said drive vanes; and said outer vane segments having a first edge attached to said drive cone and a second edge adjacent to said interior surface of said interior surface of said interior wall.

15. The constant velocity transmission of claim 1, wherein said rotational power source is an internal combustion engine of a vehicle and said output shaft communicates with wheels to rotate said wheels.

16. The constant velocity transmission of claim 1, wherein said rotational power source is a vehicle transmission having a connecting shaft communicating with the drive wheels of said vehicle and with said input shaft, and said output shaft communicates with a fixed point on a frame of said vehicle to thereby provide a means to brake the speed of said vehicle.

17. The constant velocity transmission of claim 1, wherein said rotational power source is an internal combustion engine and shaft output shaft communicates with a generator to provide variable torque and speed of rotational force communicated to said generator 17.

18. The constant velocity transmission of claim 1, wherein said rotational power source is an internal combustion engine and output shaft communicates with a propeller of a watercraft to provide variable torque and speed of rotational force communicated to said watercraft; and said fluid is the water in which said water craft is floating said fluid thereby also providing means to cool said constant velocity transmission during use.

19. A constant velocity transmission for use in combination with a rotational power source comprising:

an output shaft having a center axis therethrough;

a drum attached at rear end to said output shaft, said drum having a front end, a rear end, and having a cylindrical wall communicating between said rear end and said front end;

said cylindrical wall having an interior surface and an exterior surface;

a sealed housing defined by the area in between said cylindrical wall and said front end and said rear end of said drum;

an input shaft having a center axis therethrough in line with said center axis of said output shaft;

said input shaft having a front end and having an internal end communicating in sealed rotational engagement through said front end of said drum and into said sealed housing;

a drive cone mounted about said input shaft;

a plurality of drive vanes each having an attachment edge and a distal edge, said drive vanes slidably attached at said attachment edge to said drive cone;

means to laterally translate the distal ends of said drive vanes to a determined position from said center axis;

a plurality of stater vanes located about said interior surface of said cylindrical wall;

said distal ends of said drive vanes varying in distance from said stater vanes depending upon said determined position;

fluid located in said sealed housing; and said input shaft when rotated by said rotational power source thereby imparting rotational force to said drive vanes which transfer said force to said fluid in said sealed housing, and said fluid rotating said drum by imparting said rotational force to said stater vanes, said rotational force imparted to said drum being infinitely variable depending upon said determined position, whereby and the speed and torque communicated to said output shaft attached to said drum, from said input shaft, may be infinitely varied by laterally translating said plurality of drive vanes to said determined point between and thereby adjusting the distance between said distal ends of said drive vanes and said stater vanes.

* * * * *